Feb. 6, 1923.
F. V. DETWILER,
COOKING STOVE,
FILED APR. 16, 1921.
1,444,733.
5 SHEETS—SHEET 1.
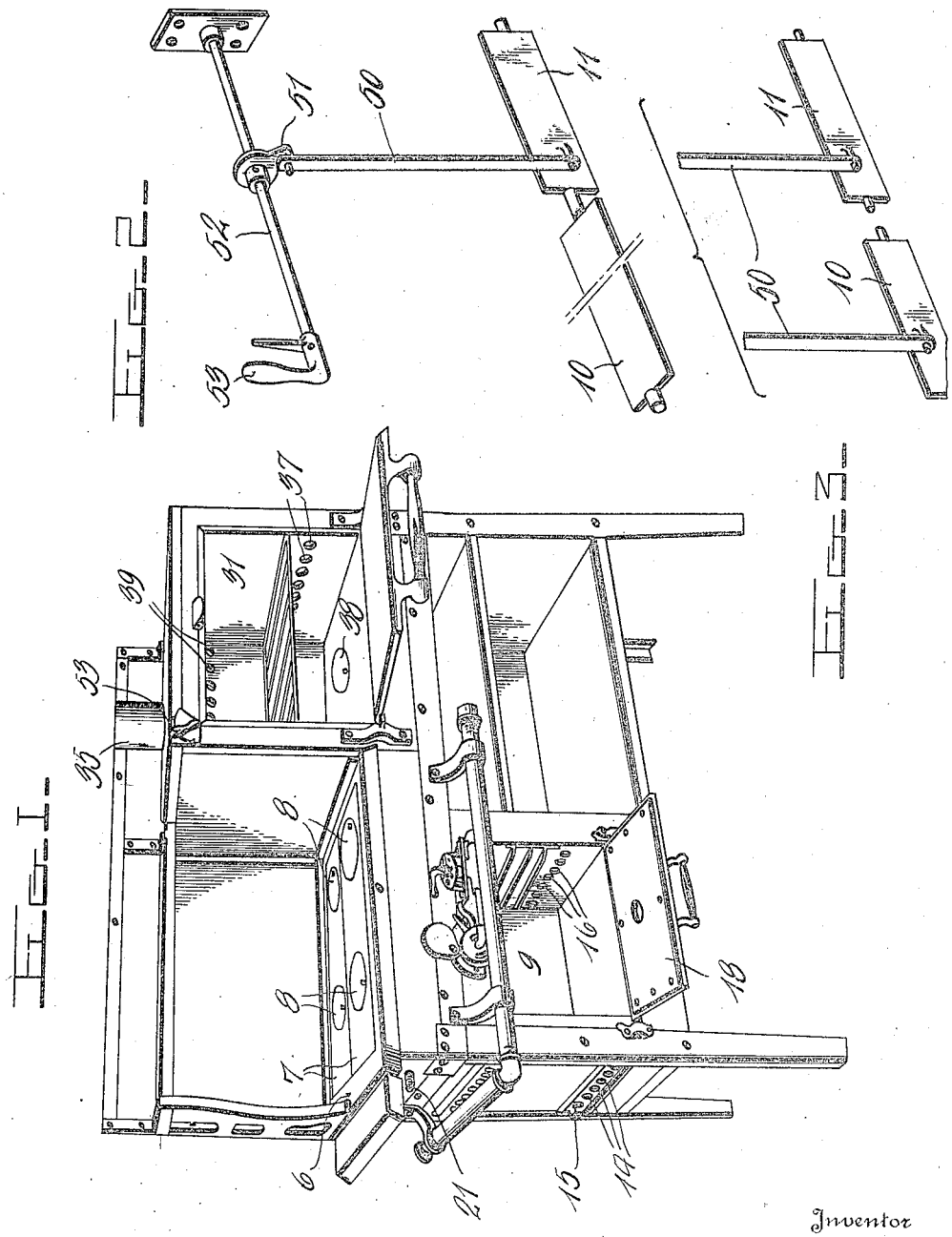
Inventor
F. V. Detwiler
By
Attorney

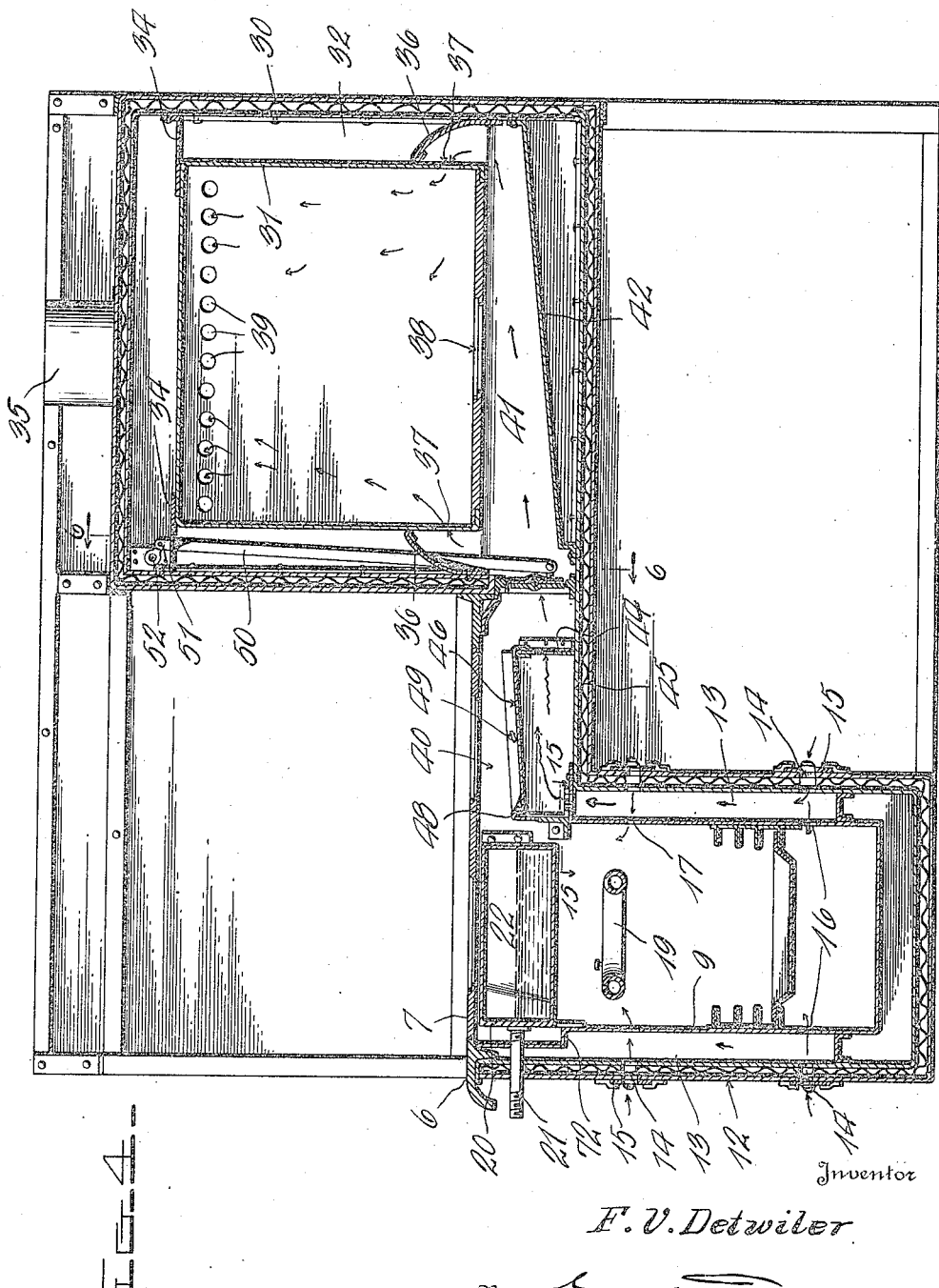

Feb. 6, 1923.
F. V. DETWILER.
COOKING STOVE.
FILED APR. 16, 1921.
1,444,733.
5 SHEETS—SHEET 3.
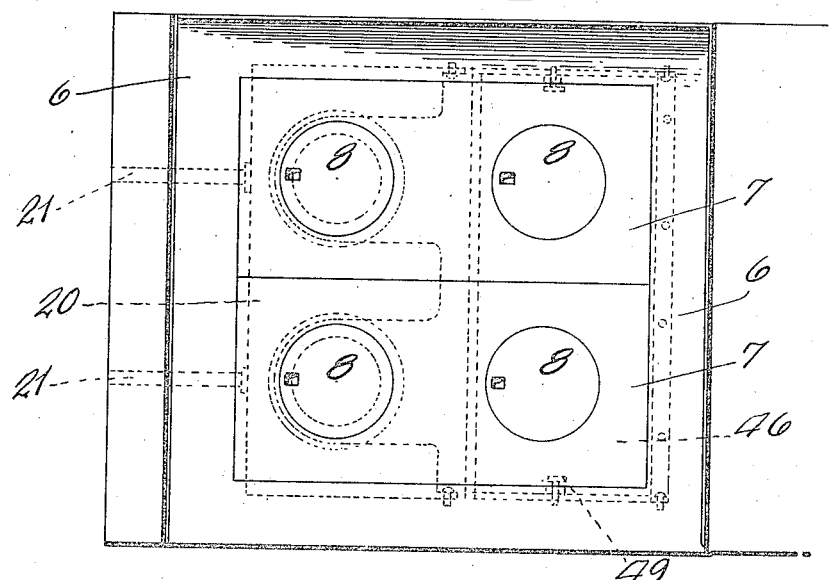
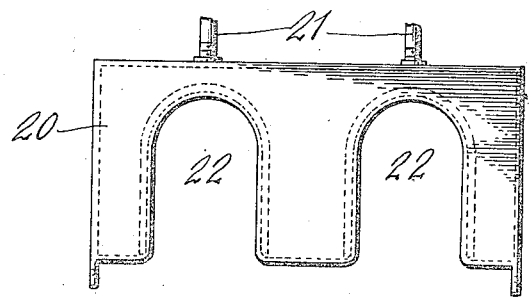
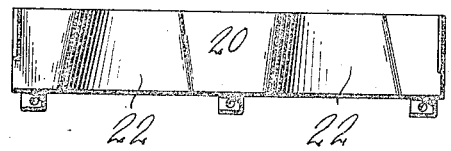
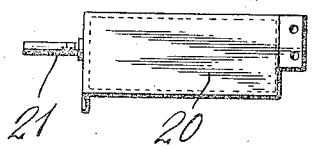
Inventor
F. V. Detwiler
By
Attorney Feb. 6, 1923.
F. V. DETWILER.
COOKING STOVE.
FILED APR. 16, 1921.
1,444,733.
5 SHEETS—SHEET 4.
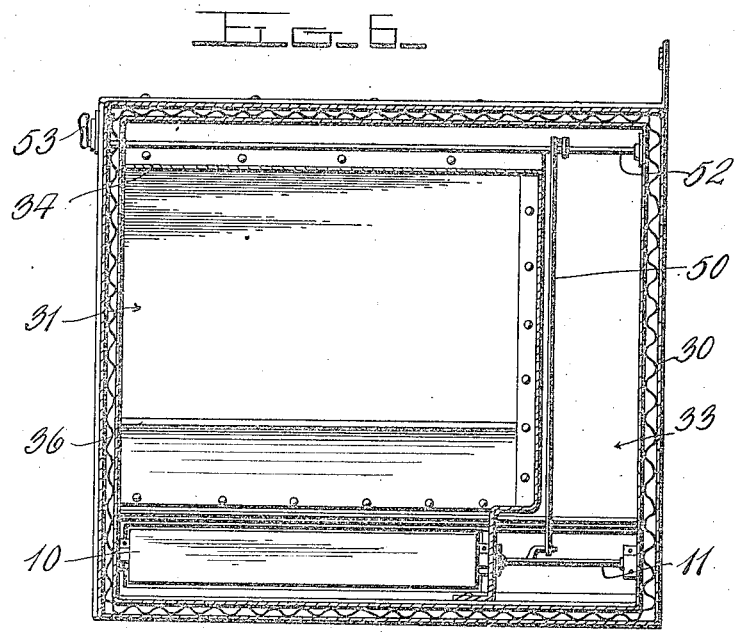
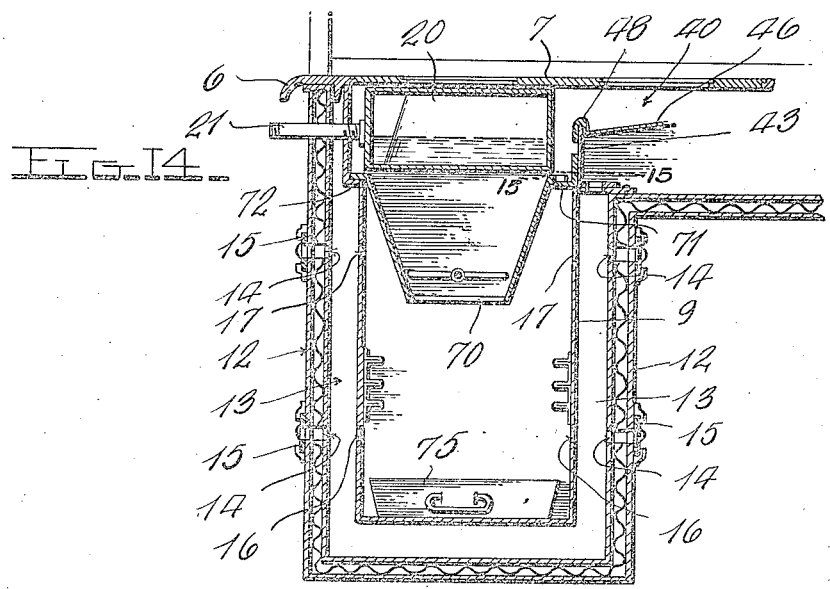
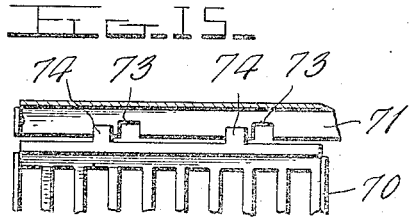
Inventor
F. V. Detwiler
By
Attorney

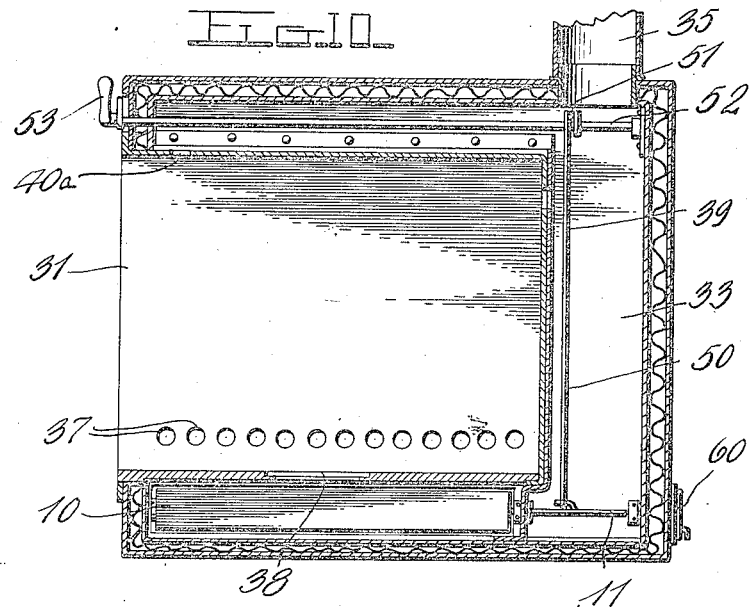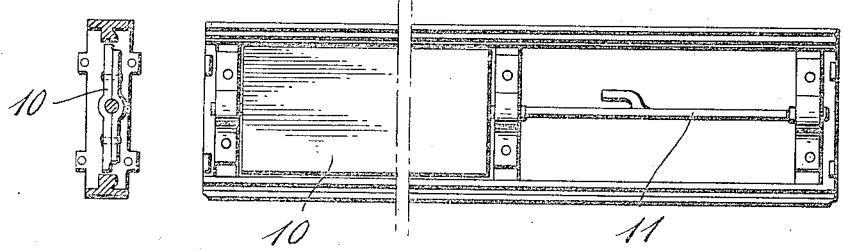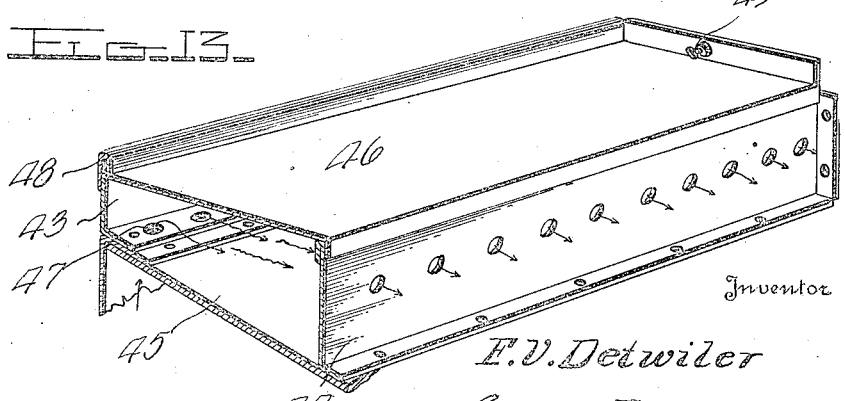

Patented Feb. 6, 1923.

1,444,733

UNITED STATES PATENT OFFICE.

FOREST V. DETWILER, OF POTTSTOWN, PENNSYLVANIA.

COOKING STOVE.

Application filed April 16, 1921. Serial No. 462,063.

*To all whom it may concern:*

Be it known that I, FOREST V. DETWILER, citizen of the United States, residing at Pottstown, in the county of Montgomery and State of Pennsylvania, have invented certain new and useful Improvements in Cooking Stoves, of which the following is a specification.

In my prior U. S. Patents #1,205,438 and 1,209,683 there are disclosed gas cooking stoves of the elevated oven type, having a pair of burners from which heat is supplied to the ordinary top or openings, and also when desired to the oven, suitable dampers being provided to control the flow to the oven.

The present invention has for its object to provide certain improvements on the stoves shown in said patents. These improvements relate particularly to means whereby a coal grate may be substituted for the gas burners, so as to produce a convertible gas and coal range in which either fuel may be used. This convertible arrangement necessitates certain changes which will more fully appear in the following description.

The present invention is also characterized by an improved manner of supplying heated air to the oven, in addition to the products of combustion, as it is well known to be desirable to provide a sufficient supply of fresh air, heated of course, to an oven chamber in which articles are being cooked.

A further feature of the invention is the provision of an improved removable drip or grease pan, whereby the drippings from vessels which boil over or the like can be quickly removed and not burnt with the production of bad odors, this being a known objection to many forms of gas stoves.

A further object of the invention is to form an improved damper control of the heat supplied to the oven.

A further object of the invention is to provide an improved water-back arrangement, the particular device not only serving as a water-back but also serving to direct the heat from the burner to the stove holes.

A further feature of the invention is an improved guide or flue for conducting the heat to the oven.

A further feature of the invention is a pot hole arrangement in the oven, whereby a pot or the like can be placed in the oven for cooking purposes, and the fumes arising therefrom will be carried out through the oven outlet and will not escape into the room.

Various other improvements and advantages in the details of the stove will be apparent from the following description and the accompanying drawings in which Fig. 1 is a perspective view of the stove. Fig. 2 is a perspective view of the damper arrangement. Fig. 3 is a perspective view of a modified damper arrangement, the dampers being operated by two handles instead of one. Fig. 4 is a vertical section of the stove. Fig. 5 is a plan of the stove top. Fig. 6 is a vertical section through the oven from front to back. Figs. 7, 8 and 9 are plan, side and end elevations of the water-back. Fig. 10 is a vertical section across the oven. Figs. 11 and 12 are end and plan views of the damper. Fig. 13 is a detail in perspective of a hot air box in the heat flue. Fig. 14 is a partial section similar to Fig. 4 showing the coal grate in place. Fig. 15 is a section on the line 15—15 of Fig. 14 showing the manner of supporting the coal grate.

Referring specifically to the drawings, the stove comprises a frame 6 and two top sections 7 fitting in said frame and provided with stove holes closed by lids 8. The sections 7 are removable or can be lifted off to permit access to the parts thereunder. Under the stove top is a broiler casing 9 surrounded by insulated walls 12 spaced therefrom to form an air space 13 having air inlets 14 controlled by sliding dampers 15, the casing 9 being provided with air holes 16 at the lower part and air holes 17 at the upper part, and with the usual door 18. The burners 19 may be of the type described in my Patent #1,209,683, reversible to direct the flame downwardly, and these burners are removable in the manner disclosed in said patent.

Under the stove top and above the burners is a water-back 20 with connecting pipes 21 extending through the end wall of the stove. This water-back has the form of a double U, as shown particularly in Fig. 7, with spaces 22 located in line with or above the respective burners and under the stove holes at that end of the stove top, the inner walls of the spaces 22 converging somewhat toward the top and serving to direct the heat of combustion to the stove holes. The water-back thus serves the double purpose of heating water and guiding the products of combustion to the stove holes.

The elevated oven structure is located at the opposite end of the stove, and comprises an insulated outer wall 30, with an oven chamber 31, therein, this casing 31 being spaced from the outer side and end walls of the structure, thereby producing side flues 32 and a back flue 33, the former being closed at the top by plates 34, but the latter being open to the outlet 35. A pair of deflecting plates 36 are also located in the flues or passages 32, to direct the products of combustion into or through openings 37 in the oven wall. The bottom of the oven has a pot hole 38 which may be closed by a suitable lid. Outlet from the oven takes place through a series of holes 39 in the upper part of its back wall as well as through a series of holes 40$^a$ in the front part of its top wall, thereby insuring a complete circulation of heated air within the interior of the oven.

The fire box or space above the burners communicates through a flue 40 to a flue 41 located under the bottom of the oven, and the bottom of the flue 41 is formed by an inclined plate 42 extending upwardly toward the end of the oven casing. I have found that this inclined plate or flue is of importance in preventing pocketing or retarded flow of gases in the space around the oven chamber.

The flue 40 extends over what I term the hot air box shown especially in Fig. 13. This box consists of two end walls 43 and 44 and a bottom plate 45, and a removable top plate 46, and it is to be noticed that the bottom plate 45 is provided with openings 47 through which fresh air is admitted into the box from the space 13 between the fire box 9 and the outer casing 12, and this air after passing through the box escapes through the openings 44 and is carried thence to the oven. The removable top 46 serves as a grease pan to collect drippings from the pair of stove holes directly above it, and can be removed by taking off the stove top in order to be cleaned. Said plate is flanged as indicated at 48 to fit over the walls of the box, and is further held in place by thumb screws 49 which are tapped through flanges at the ends of the plate and may be clamped against side walls of the flue.

The flow of air from the flue 40 to the oven or outlet flues is controlled by a double damper which in the form shown in Fig. 2 consists of two blades 10 and 11 set at an angle to each other, one of these blades being connected by a rod 50 to an arm 51 on a rod 52 provided with a handle 53 at the upper inner corner of the oven casing. As most clearly shown in Figs. 6 and 10, when the handle is turned one way the damper blade 10 closes the connection between the flues 40 and 41 and the damper blade 11 opens the direct connection from the flue 40 (which extends entirely across the stove top) to the upright or outlet flue 33 at the back of the oven, thereby producing a direct draft to the outlet instead of an indirect draft around the oven chamber. When the damper is reversed the flue 41 is connected to the flue 40, for heating the oven, the direct outlet flue being closed by the closure of the damper section 11. Instead of using a single damper provided with two blades operated by a single handle separate dampers may be used, with a link connected to each, as indicated in Fig. 3. The single handle has the advantage of operating both dampers at the same time, but the double link construction will have some advantages in the event of breakage of either damper or its connections. However, as stated, either modification may be used.

The inflow of fresh air from the space 13 through the heating box under the top 46 results in the supply of a sufficient amount of fresh air to the oven, in addition to the products of combustion, which is highly desirable in cooking operations.

A door 60 may be placed in the outer casing at the lower end of the back flue 33 for cleaning out soot and the like.

For burning coal the gas burners will be removed as above indicated, and a coal grate substituted, such a grate being indicated at 70, and supported by angle irons 71 and 72 at the upper part of the fire box or broiler chamber 9. After the removal of the burner this grate may be inserted through the door at the front and then lifted up into position, and a convenient means for inserting and supporting the same is to provide the angle 71 with notches 73, as shown in Fig. 15, and providing the grate 70 with lugs 74 projecting outwardly, and when the grate is lifted up into position these lugs may be passed through the notches 73 to the space above the angle iron, and then the grate moved or shifted backwardly until the lugs rest on the angle iron. This permits the grate to be very quickly placed or removed. When a coal grate is used an ash pan 75 may be slid into the bottom of the broiler chamber. It will be noticed that air is supplied to the burner or to the coal grate, through the openings 16 and 17 in the walls of the broiler chamber.

A convenient change from gas to coal as fuel is desirable under many conditions where the supply of either is uncertain and liable to interruption.

The other details of the stove may follow existing practice with respect to shelves in the broiler and in the oven, and in the space beside the broiler and above the stove top, and particularly the description thereof is considered to be unnecessary.

I claim:

1. In a stove, the combination of a cooking top, an oven beside said top, a burner under the top, a flue leading from the burner to the oven, and an air box under the flue, having an outlet to the flue and a removable top plate located under said top, to catch drippings.

2. In a stove, the combination of a cooking top, an oven beside said top, a fire box under the top, a flue extending from said fire box to the oven, and an air box located in said flue, under said top, and having an air inlet from a space exterior to the fire box, and an outlet into said flue, said air box also having a removable top plate under the cooking top, to catch dirt.

3. In a stove, an oven structure having spaced outer and inner walls forming flues between the walls, one flue being located at the back of the oven and having an outlet, a heat flue leading to said space, and a pair of dampers between the heating flue and said space, one damper controlling the flow to a flue in the bottom of the structure and the other controlling the flow to said back flue.

4. In a stove, an oven structure having walls spaced apart at the back, sides and bottom, forming bottom, side and back flues, a heat flue leading to said space, a damper controlling the flow from the heat flue to the bottom flue, and a damper controlling the flow from the heat flue to said back flue.

5. In a stove, an oven structure comprising an outer casing, an inner casing spaced therefrom at the bottom, sides and back, forming communicating bottom, side and back flues, the latter having an outlet, a heat flue, a damper between the heat flue and the bottom flue, and another damper between the heat flue and the back flue.

6. In a stove, an oven structure comprising an outer casing, an inner casing spaced therefrom at the bottom, sides and back, forming communicating bottom, side and back flues, the latter having an outlet, a heat flue, a damper between the heat flue and the bottom flue, and another damper between the heat flue and the back flue, and a single operating device connected to both of said dampers whereby one will be open when the other is closed.

7. In a stove, an oven structure comprising an outer casing, an inner casing spaced therefrom at the bottom, sides and back, forming communicating bottom, side and back flues, the latter having an outlet, a heat flue, a damper between the heat flue and the bottom flue, and another damper between the heat flue and the back flue, both of said dampers being mounted on the same pivot rod, and a single operating device connected to said rod.

8. In a stove, an oven structure comprising inner and outer walls spaced apart at the bottom, sides, back and top, forming corresponding flues, the bottom flue having an outlet, and the inner oven wall having openings from the side flues near the lower ends thereof and openings to the top and back flues near the upper end thereof, a heating flue, and means to connect the heating flue with either the bottom flue or the back flue.

9. In a stove, an oven structure comprising inner and outer walls spaced apart at the bottom, sides, back and top, forming corresponding flues, the bottom flue having an outlet, and the inner oven wall having openings from the side flues near the lower ends thereof and openings to the top and back flues near the upper end thereof, a heating flue, and means to connect the heating flue with either the bottom flue or the back flue, said means comprising a pair of dampers located at a lower corner of the oven structure adjacent the end of the bottom flue and the lower end of the back flue respectively.

In testimony whereof, I affix my signature.

FOREST V. DETWILER.